United States Patent
Lee

(10) Patent No.: US 10,074,843 B2
(45) Date of Patent: Sep. 11, 2018

(54) BATTERY MODULE

(71) Applicant: SAMSUNG SDI CO., LTD., Yongin-si, Gyeonggi-do (KR)

(72) Inventor: Seung Ki Lee, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 103 days.

(21) Appl. No.: 15/150,305

(22) Filed: May 9, 2016

(65) Prior Publication Data

US 2016/0336564 A1 Nov. 17, 2016

(30) Foreign Application Priority Data

May 15, 2015 (KR) ........................ 10-2015-0068061

(51) Int. Cl.
*H01M 2/10* (2006.01)
*H01M 2/20* (2006.01)
*H01M 2/04* (2006.01)

(52) U.S. Cl.
CPC ........... *H01M 2/204* (2013.01); *H01M 2/043* (2013.01); *H01M 2/0404* (2013.01); *H01M 2/206* (2013.01)

(58) Field of Classification Search
CPC .... H01M 2/0404; H01M 2/204; H01M 2/043; H01M 2/206
USPC .......................................................... 429/99
See application file for complete search history.

(56) References Cited

U.S. PATENT DOCUMENTS

| | | | |
|---|---|---|---|
| 7,998,611 B2 | 8/2011 | Yoshihara et al. | |
| 2011/0293998 A1* | 12/2011 | Sato | H01M 2/1077 429/159 |
| 2013/0207612 A1* | 8/2013 | Lev | H01M 2/202 320/134 |
| 2013/0316200 A1 | 11/2013 | Ochi | |
| 2014/0193680 A1 | 7/2014 | Lee et al. | |
| 2014/0205888 A1* | 7/2014 | Kim | H01M 2/206 429/158 |
| 2014/0205889 A1* | 7/2014 | Kim | H01M 2/206 429/158 |
| 2015/0140393 A1* | 5/2015 | Yamamoto | H01M 2/1077 429/121 |

FOREIGN PATENT DOCUMENTS

| | | | | |
|---|---|---|---|---|
| JP | 2010-177204 A | 8/2010 | | |
| JP | 2013-51175 A | 3/2013 | | |
| KR | 10-2011-0076808 A | 7/2011 | | |
| KR | 10-2014-0090077 A | 7/2014 | | |
| WO | WO 2014020731 A1 * | 2/2014 | ......... | H01M 2/1077 |

\* cited by examiner

*Primary Examiner* — Jonathan G Jelsma
*Assistant Examiner* — Omar M Kekia
(74) *Attorney, Agent, or Firm* — Lewis Roca Rothgerber Christie LLP

(57) ABSTRACT

A battery module includes a plurality of battery cells, each of the battery cells including an electrode terminal; a cell cap coupled to an electrode terminal of one of the battery cells; a bus bar coupling adjacent ones of the battery cells to each other in parallel; and a connection member coupling the cell cap and the bus bar to each other.

11 Claims, 5 Drawing Sheets

BATTERY MODULE

CROSS-REFERENCE TO RELATED APPLICATION

This application claims priority to and the benefit of Korean Patent Application No. 10-2015-0068061, filed on May 15, 2015 in the Korean Intellectual Property Office, the content of which is incorporated herein by reference in its entirety.

BACKGROUND

1. Field

Aspects of embodiments of the present invention relate to a battery module including a plurality of battery cells.

2. Description of the Related Art

Generally, secondary batteries are designed to be repeatedly charged and reused, unlike primary batteries which are only designed to be discharged.

Secondary batteries can be used as an energy source (e.g., a power source) for a mobile device, an electric vehicle, a hybrid vehicle, an electric bicycle, an uninterruptible power supply, and the like. Depending on the type of external device, secondary batteries may be employed as a single battery or as a battery module including multiple batteries coupled to each other and bundled in one unit.

Small mobile device, such as a cell phone, may operate for a certain amount of time according to an output and capacity of a single battery. If high powered operation is required over a long period of time, such as for an electric vehicle, a hybrid vehicle, and the like, a battery module may be used to provide sufficient output and capacity.

In a large capacity battery module, multiple battery cells (e.g., 8P, 12P, 20P, and the like) may be connected to each other in parallel. An anode of the battery cells may be welded to a nickel tab. However, when one or more of the battery cells of the battery module is defective (e.g., needs to be replaced), the entire battery module may need to be discarded because replacement of only the defective cell(s) is not easy.

SUMMARY

An aspect of embodiments of the present invention provides a battery module including multiple battery cells in which defective battery cells can be easily replaced.

In an embodiment of the present invention, a battery module may include a plurality of battery cells, each of the battery cells including an electrode terminal, a cell cap coupled to the electrode terminal of one of the battery cells, a bus bar coupling adjacent ones of the battery cells to each other in parallel, and a connection member coupling the cell cap and the bus bar to each other.

One of the cell cap or the bus bar may have an insertion groove therein, and the connection member may be configured to be coupled to the cell cap or the bus bar at the insertion groove. The connection member may further include an inserting portion configured to be inserted into and coupled to the insertion groove in a first direction, the first direction corresponding to a height direction of the battery cell, and a hinge portion rotatably coupled to the other of the cell cap or the bus bar along an axis of rotation in a second direction crossing the first direction.

The connection member may further include a plurality of engaging parts at opposite sides of one end of the inserting portion and an elastic member mounted in the inserting portion. The engaging parts may be configured to move towards and away from each other along the second direction due to compression and extension, respectively, of the elastic member.

The engaging parts may be configured to move between a first position in which the engaging parts are inside the inserting portion and a second position in which the engaging parts protrude from the inserting portion. When moving from the second position to the first position, the engaging parts may move towards each other along the second direction due to compression of the elastic member. When moving from the first position to the second position, the engaging parts may move away from each other along the second direction due to extension of the elastic member.

An end of each of the engaging parts exposed from the insertion portion in the second position may have a triangular pyramid shape.

The one of the cell cap or the bust bar having the insertion groove may include a pressing portion configured to move the engaging parts from the second position to the first position by moving in the first direction or the second direction due to external pressure applied thereto.

Another end of the inserting portion may be coupled to the hinge portion at a bending portion such that the inserting portion and the hinge portion are on different planes from each other.

The inserting portion may be on a plane which includes the first direction. The hinge portion may be on a plane which includes the second direction.

The battery module may further include an insulating tape on at least a portion of the cell cap and the hinge portion when the inserting portion is inserted into and coupled to the insertion groove.

a protruding portion may be formed on a surface of the inserting portion.

BRIEF DESCRIPTION OF THE DRAWINGS

Example embodiments of the present invention will now be described more fully hereinafter with reference to the accompanying drawings; however, the present invention may be embodied in different forms and should not be construed as limited to the embodiments set forth herein. Rather, these embodiments are provided so that this disclosure will be thorough and complete, and will fully convey the scope of the present invention to those skilled in the art.

In the figures, dimensions may be exaggerated for clarity of illustration. Like reference numerals refer to like elements throughout.

DETAILED DESCRIPTION

Figure 1:
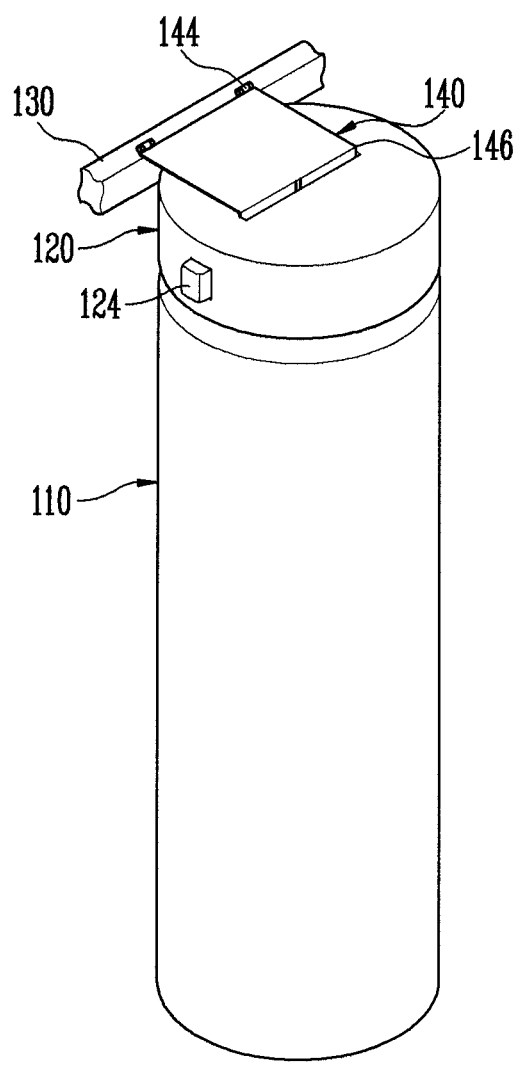
FIG. 1 is a perspective view of a portion of a battery module according to an embodiment of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. In addition, it will be understood that when an element or layer is referred to as being "on," "connected to," or "coupled to" another element or layer, it can be directly on, connected, or coupled to the other element or layer or intervening elements or layers may be present. For example, when a first element is described as being "coupled" or "connected" to a second element, the first element may be directly coupled or connected to the second element or the first element may be indirectly coupled or connected to the second element via one or more intervening elements. When an element or layer is referred to as being "directly on," "directly connected to," or "directly coupled to" another element or layer, there are no intervening elements or layers present. Like numbers refer to like elements throughout. As used herein, the term "and/or" includes any and all combinations of one or more of the associated listed items. Further, the use of "may" when describing embodiments of the present invention relates to "one or more embodiments of the present invention." Expressions, such as "at least one of," when preceding a list of elements, modify the entire list of elements and do not modify the individual elements of the list. Also, the term "exemplary" is intended to refer to an example or illustration.

It will be understood that, although the terms first, second, etc., may be used herein to describe various elements, components, regions, layers, and/or sections, these elements, components, regions, layers, and/or sections should not be limited by these terms. These terms are only used to distinguish one element, component, region, layer, or section from another region, layer, or section. Thus, a first element, component, region, layer, or section discussed below could be termed a second element, component, region, layer, or section without departing from the teachings of the present invention.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (e.g., rotated 90 degrees or at other orientations) and the spatially relative descriptors used herein should be interpreted accordingly.

The terminology used herein is for the purpose of describing particular embodiments only and is not intended to be limiting of the invention. As used herein, the singular forms, "a" and "an" are intended to include the plural forms as well, unless the context clearly indicates otherwise. It will be further understood that the terms "includes," "including," "comprise," and/or "comprising," when used in this specification, specify the presence of stated features, integers, steps, operations, elements, and/or components but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Figure 2:
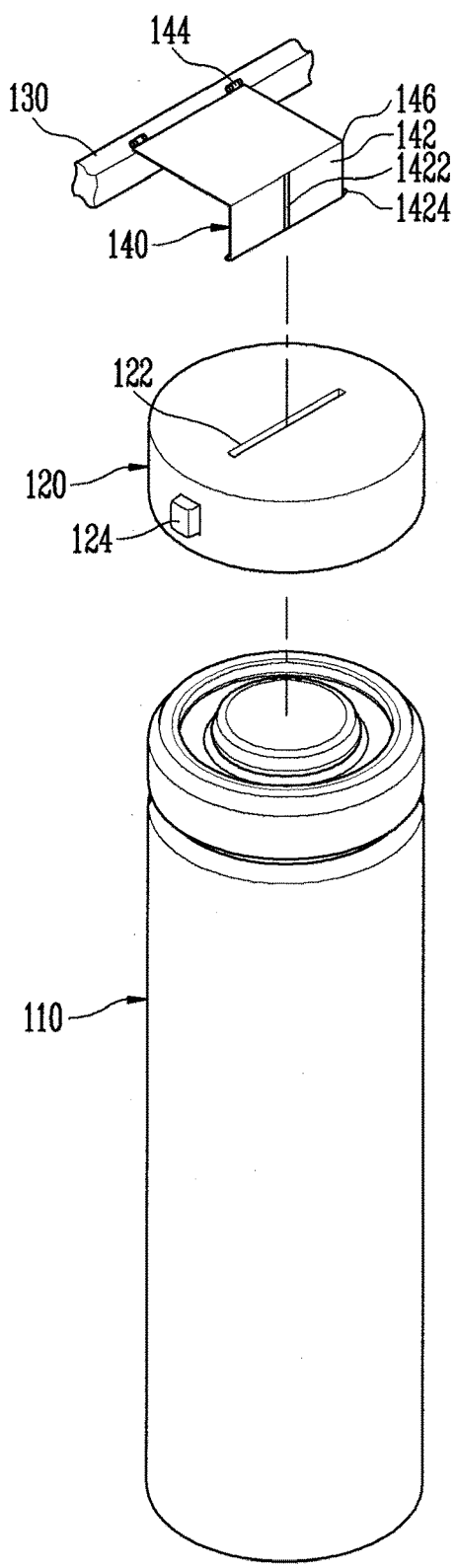
FIG. 2 is an exploded perspective view of FIG. 1.
Figure 3:
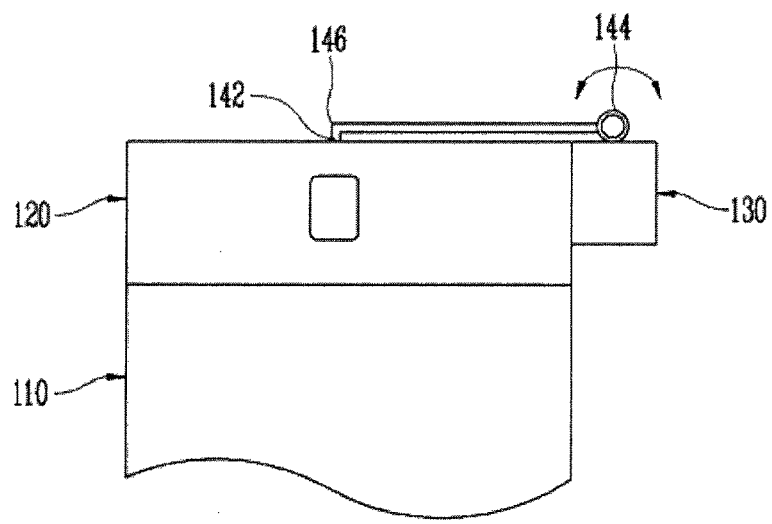
FIG. 3 is a side view of a portion of a battery module according to an embodiment of the present invention.
Figure 4:
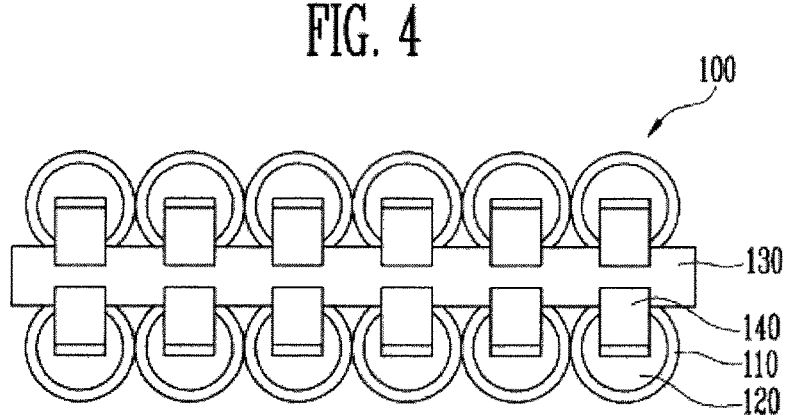
FIG. 4 is a top view of a battery module according to an embodiment of the present invention.

FIG. 1 is a perspective view of a portion of a battery module according to an embodiment of the present invention. FIG. 2 is an exploded perspective view of FIG. 1. FIG. 3 is a side view of a portion of a battery module according to an embodiment of the present invention. FIG. 4 is a top view of a battery module according to an embodiment of the present invention.

As shown in FIGS. 1 to 4, a battery module 100 according to an embodiment of the present invention may include one or more battery cells 110, one or more cell caps 120, a bus bar 130, and one or more connection members 140.

Generally, a battery module is formed by connecting battery cells to each other in parallel. The number of battery cells may vary depending on a desired output and capacity. As for the battery module 100 according to an embodiment of the present invention, 12 battery cells may be connected in parallel as shown in FIG. 4.

The cell cap 120 mounted on the battery cell 110 and the connection member 140 coupling the cell cap 120 to the bus bar 130 may have the same or substantially the same structure for each battery cell. Therefore, for convenience of illustration, one cell cap mounted on one battery cell and one connection member coupling one cell cap to the bus bar will be primarily described.

If there is a defect in one or more of the plurality of battery cells in the battery module, only the defective battery cell(s) can be easily replaced.

The battery cell 110 according to an embodiment of the present invention may be a cylindrical-type lithium ion secondary battery.

Generally, the cylindrical-type lithium ion secondary battery may include an electrode assembly wound generally in cylindrical form, a can having a cylindrical form in which the electrode assembly is accommodated, an electrolyte injected inside the can to allow the lithium ions to readily move in the electrode assembly, and a cap assembly coupled to (e.g., sealing) one side of the can, preventing leakage of the electrolyte and breakaway of the electrode assembly.

The electrode assembly may include an anode electrode plate having an anode active material coated thereon, a cathode electrode plate having a cathode active material coated thereon, and a separator positioned between the anode electrode plate and the cathode electrode plate, preventing a short and allowing movement of the lithium ions.

The anode electrode plate may be electrically coupled to the anode tab, and the cathode electrode plate electrically coupled to a cathode tab. The anode tab and the cathode tab may be electrically coupled to the cap assembly and the can, respectively.

The can may receive (e.g., accommodate) the electrode assembly, and the electrolyte may be injected inside the can, thereby allowing movement of the lithium ions.

A number (e.g., a plurality) of such battery cells 110, in a desired quantity and coupled to each other in parallel, may be provided in the battery module 100.

For convenience of illustration, the battery cell 110 is described as being cylindrical type. However, the present invention is not limited thereto. The cell cap 120, the bus bar 130, and the connection member 140 may be applied to various shapes of battery cells (e.g., a quadrilateral battery cell).

The cell cap 120 according to an embodiment of the present invention may be electrically coupled to an electrode terminal of the battery cell 110.

The cell cap 120 may be electrically coupled to the anode terminal of the battery cell 110. In one embodiment, the anode terminal of the battery cell may be a cap assembly to which the anode tab (e.g., an inside or inner anode tab) is coupled, such that the cell cap 120 is coupled to the cap assembly of the battery cell.

The cell cap 120 may have a shape such that it can engage with (e.g., is configured to be engaged with) a top of the battery cell. Inside, the cell cap 120 may have a structure in which it directly contacts the cap assembly of the battery cell. For example, but without limitation thereto, a lower portion of the cell cap 120 may have a bent shape bending towards an inside (e.g., a center) thereof, such that the cell cap 120 may be stably mounted onto a groove formed at a top portion of the battery cell. A plate-like structure to directly contact the cap assembly of the battery cell may be added inside the cell cap 120.

Because the cell cap 120 is to perform the function of (e.g., acts as) an electrical channel to connect the battery cells 110 to each other in parallel along the bus bar 130 and the connection member 140, the cell cap 120 may have (e.g., may include or may be formed of) conductive material.

Because the cell cap 120 may be removed from the battery module along with the defective battery cell 110, the cell cap 120 may be joined to the battery cell by welding.

In one embodiment, the cell cap 120 is a separate component from the cap assembly of the battery cell. However, in another embodiment, the cell cap may form the cap assembly of the battery cell (e.g., the cell cap may be integral with the cap assembly). In one embodiment, the anode tab inside the battery cell may be directly coupled to the cell cap, and the cell cap may be an anode terminal.

In an embodiment, an insertion groove 122 (e.g., an insertion opening or slit) may be formed on (e.g., formed in) the cell cap 120 for a portion of the connection member 140 to be mounted therein.

The bus bar 130 may be configured to couple the battery cell 110 in parallel with another battery cell adjacent thereto. There may be one bus bar 130 for the entire battery module 100, coupling a plurality of cell caps and a plurality of connection members mounted at each battery cell together.

The connection member 140 may be between the cell cap 120 and the bus bar 130 and may electrically couple the cell cap 120 to the bus bar 130.

In one embodiment, the insertion groove 122 may be formed in the cell cap 120 as shown in FIGS. 1 to 4.

The connection member 140 may include an inserting portion 142 to be inserted into and fixed in the insertion groove 122 in a height direction of the battery cell 110 (hereinafter, the "first direction") and hinge portions 144 rotatably coupled to the bus bar 130 along an axis of rotation in a direction crossing the first direction at a right angle (hereinafter, the "second direction").

An uneven portion 1422 (e.g., a protruding portion) may be formed on at least one surface of the inserting portion 142, such that the inserting portion 142 may be more firmly engaged with the insertion groove 122. The uneven portion 1422 may reduce electrical resistance between the cell cap 120 and the connection member 140 by increasing a contact area between the cell cap 120, which functions as an electrical channel, and the connection member 140.

The cell cap 120 and the connection member 140, forming an electrical channel along with the bus bar, may each have (e.g., may include or may be formed of) conductive material.

The connection member 140 may include a bending portion 146 coupling the inserting portion 142 and the hinge portion 144 such that the inserting portion 142 and the hinge portion 144 are provided on different planes. The other end of the inserting portion 142 may be coupled to the hinge portion 144 through the bending portion 146. For example, but without limitation thereto, when the inserting portion 142 is on a plane which includes the first direction, the hinge portion 144 is on a plane which includes the second direction.

As shown in FIGS. 3 and 4, one bus bar 130 may be positioned between two rows of battery cells arranged parallel to each other in the second direction (in one embodiment, one array includes six battery cells that are arranged in a row in the second direction). Due to a rotational structure including the hinge portion 144 rotatably coupled to the bus bar 130, an insertion fix structure including the inserting portion 142 inserted and fixed in the insertion groove of the cell cap, and a coupling structure including the bending portion 146 coupling the inserting portion 142 to the hinge portion 144 such that the inserting portion 142 and the hinge portion 144 are on different planes, multiple battery cells may be coupled to each other in parallel.

According to an embodiment, if one or more of the battery cells are defective, the defective cell(s) may be easily removed. Hereinafter, the insertion fix structure of the inserting portion 142 will be described in more detail.

Figure 5:
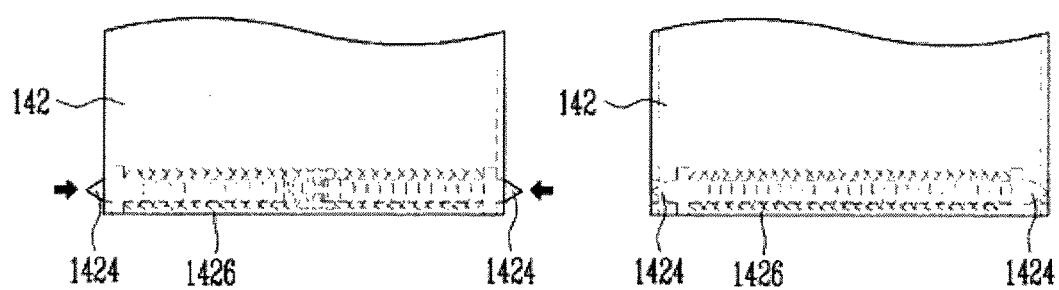
FIG. 5 illustrates an inner structure of an inserting portion according to an embodiment of the present invention.

FIG. 5 illustrates an inner structure of an inserting portion 142 according to an embodiment of the present invention.

As shown in FIG. 5, engaging parts 1424 (e.g., a pair of engaging parts) may be provided on both sides (e.g., opposite sides) of one end (e.g., a distal end) of the inserting portion 142, the pair of engaging parts 1424 moving in a direction along the second direction or in a direction away from (e.g., opposite to) the second direction due to compression or extension of an elastic member 1426 mounted inside the inserting portion.

The second direction is a direction which crosses the first direction at a right angle (e.g., the second direction is perpendicular to the first direction), and the first direction is a direction along which the inserting portion 142 is inserted into the insertion groove 122 of the cell cap 120. The second direction is a direction consistent with the axis of rotation of the hinge portion 144 (e.g., a direction that includes the axis of rotation of the hinge portion) as described above.

The pair of engaging parts 1424 may be, as shown in FIG. 5B, positioned inside (e.g., may not extend outside of) the one end of the inserting portion when they move in a direction towards each other along the second direction due to compression of the elastic member (hereinafter, the "first location" or the "first position") or may be, as shown in FIG. 5A, exposed to the outside of one end of the inserting portion when they move away from each other along the second direction due to extension of the elastic member (hereinafter, the "second location" or the "second position").

The elastic member 1426 may be mounted in the inserting portion 142 and may be a coil spring configured to move back and forth (e.g., configured to expand and compress) in a direction such that the pair of engaging parts 1424 may move towards or away from each other. However, the present invention is not limited thereto.

The pair of engaging parts 1424 may be, as shown in FIGS. 2 and 5, normally exposed to outside of the one end of the inserting portion 142 (e.g., in the second location or in the second position) and, as the inserting portion 142 is inserted into the insertion groove 122, the engaging parts 1424 may go inside of (e.g., may retract into) the one end of the inserting portion 142 for smooth insertion into the insertion groove (e.g., in the first location or in the first position). When the insertion of the inserting portion 142 into the insertion groove 122 is completed (e.g., when the inserting portion 124 is fully inserted into the insertion groove 122), the engaging parts 1424 may be exposed again (e.g., may extend) to outside of the one end of the inserting portion 142 such that the inserting portion is inserted and fixed in the insertion groove (e.g., in the second location or in the second position).

When the inserting portion is removed from the insertion groove, the pair of engaging parts 1424 may go inside the inserting portion 142 for smooth removal (e.g., in the first location or in the first position).

The pair of engaging parts 1424 being exposed to outside of the one end of the inserting portion may have triangular pyramid form as shown in FIGS. 2 and 5.

When the inserting portion 142 is inserted into the insertion groove 122, the pair of engaging parts 1424 may be pressed inward as they contact an entrance of the insertion groove 122 (e.g., as they contact an upper surface of the cell cap 120), and thus, the inserting portion may be inserted into the insertion groove. In addition, this connection structure may provide a user with a sense of clicking, thereby signaling completion of the insertion.

A pressing portion 124 (e.g., a button) which moves the pair of engaging parts from the second location to the first location may be formed on the cell cap 120. The pressing portion 124 may move along the second direction due to external pressure for more convenient removal of the connection member 140 from the cell cap 120 as the inserting portion 142 is removed from the insertion groove 122.

The pressing portion 124, which moves the pair of engaging parts 1424 in a direction towards each other along the second direction when the pair of engaging parts 1424 are positioned inside the cell cap 120, may be formed on a side portion of the cell cap 120.

So that ends of each of the pair of engaging parts 1424 may be pressed, there may be a pair of the pressing portions 124. The pair of pressing portions may be formed on opposite side portions of the cell cap 120 along the second direction.

In an embodiment, if there are one or more defective cell(s) in the battery module 100, the pair of pressing portions 124 of the cell cap(s) 120 corresponding to the defective cell(s) may be pressed to easily remove the connection member 140 from respective the cell cap 120. Therefore, only the defective cell(s) may be easily removed.

The battery module 100 may be reformed (e.g., repaired) by mounting new battery cells at locations where the defective cells were removed (e.g., by inserting and fixing the inserting portion of the connection member 140 in the insertion groove of the corresponding cell cap of the new battery cells), thus, cost may be reduced.

Figure 6:
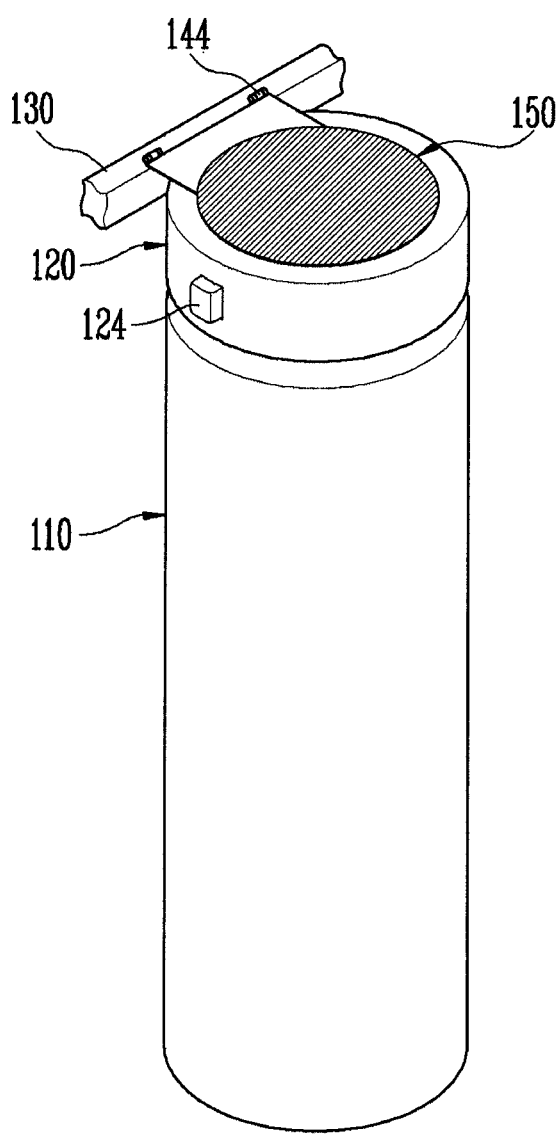
FIG. 6 is a perspective view of a portion of a battery module according to another embodiment of the present invention.

As shown in FIG. 6, the battery module 100 according to an embodiment of the present invention may further include an insulating tape 150 attached to at least a portion of the cell cap 120 and the hinge portion 144.

The insulating tape 150 may be attached to at least a portion of the cell cap 120 and the hinge portion 144 in a state in which the inserting portion 142 is inserted and fixed in the insertion groove 122 by the pair of the engaging parts 1424. As a result, an electrical connection between the cell cap 120 and the connection member 140 may be made firmer (e.g., may be secured) and may be insulated from outside (e.g., may be insulated from outside or external contact).

Figure 7:
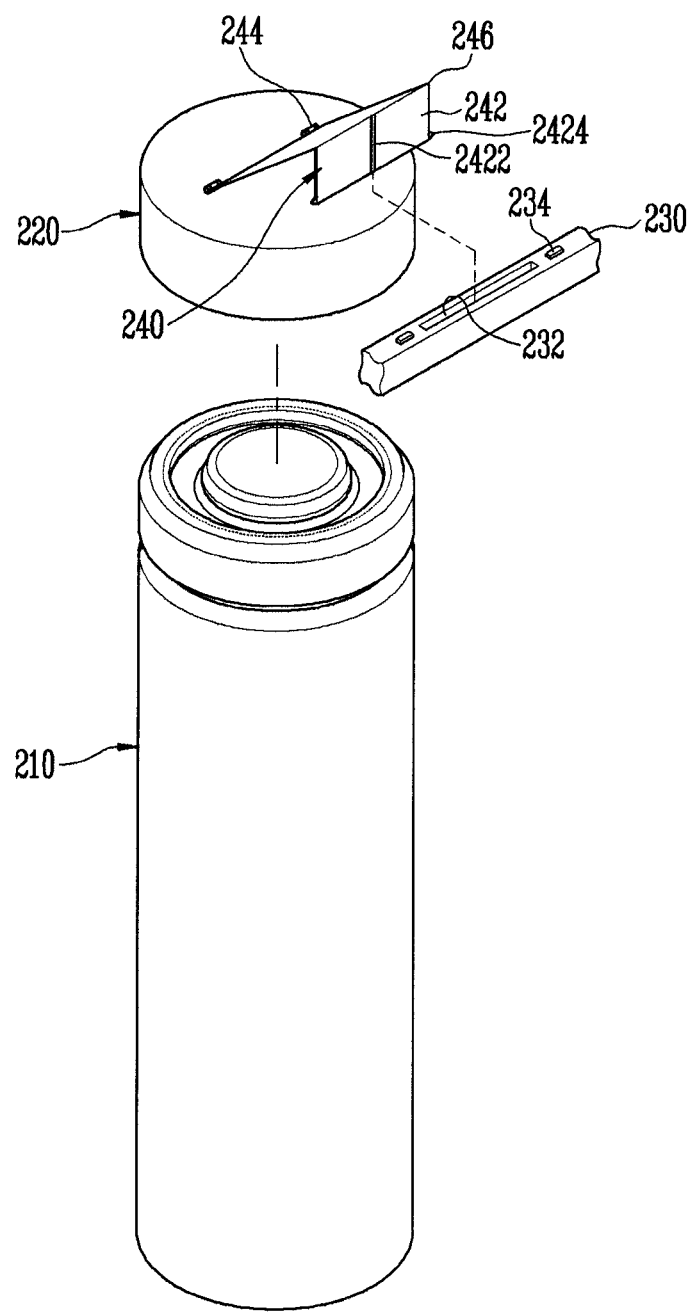
FIG. 7 is a perspective view of a portion of a battery module according to another embodiment of the present invention.

FIG. 7 is a perspective view of a portion of a battery module 200 according to another embodiment of the present invention.

As shown in FIG. 7, a connection member 240 coupling a cell cap 220 and a bus bar 230 may be, different from the battery module 100 described above, inserted and fixed in the first direction in an insertion groove 232 formed at (e.g., formed in) the bus bar 230, and a hinge portion 244 may be rotatably coupled to the cell cap along the axis of rotation in the second direction.

A pair of pressing portions 234, which move a pair of engaging parts 2424 provided on both sides of the inserting portion 242 along the second direction towards each other, may be formed on the bus bar 230.

The pair of pressing portions 234 may be formed on a top part (e.g., an upper surface) of the bus bar 230 and may move the pair of engaging parts 2424 from the second location to the first location by moving in the first direction due to external pressure.

Because the pair of engaging parts 2424 exposed to outside of the one end of the inserting portion as described above may be triangular pyramid shaped, even when the pressing portion presses the engaging parts in the second direction, the pair of engaging parts may move along the second direction and when the pressing portion presses the engaging part in the first direction, the pair of engaging parts will move along the second direction.

Other than the configuration of the connection member 240 being different to that of the connection member 140, and accordingly, the location of the insertion groove 232 being in the bus bar instead of the cell cap and the pressing portion 234 being on the bus bar instead of the cell cap, all other configurations are the same or substantially the same as the battery module 100 as described above. Therefore, repetitive descriptions thereof may be omitted.

Example embodiments of the present invention have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims and their equivalents.

What is claimed is:

1. A battery module comprising:
   a plurality of battery cells, each of the battery cells comprising an external electrode terminal;
   a cell cap coupled to the electrode terminal of one of the battery cells;
   a bus bar coupling adjacent ones of the battery cells to each other in parallel; and
   a connection member hingedly connected to one of the cell cap or the bus bar and electrically coupling the cell cap and the bus bar to each other.

2. The battery module as claimed in claim 1, wherein the other one of the cell cap or the bus bar has an insertion groove therein, and the connection member is configured to be coupled to the other one of the cell cap or the bus bar at the insertion groove, and
wherein the connection member further comprises:
an inserting portion configured to be inserted into and coupled to the insertion groove in a first direction, the first direction corresponding to a height direction of the battery cell; and
a hinge portion rotatably coupled to the one of the cell cap or the bus bar along an axis of rotation in a second direction crossing the first direction.

3. The battery module as claimed in claim 2, wherein the connection member further comprises:
a plurality of engaging parts at opposite sides of one end of the inserting portion; and
an elastic member mounted in the inserting portion, and
wherein the engaging parts are configured to move towards and away from each other along the second direction due to compression and extension, respectively, of the elastic member.

4. The battery module as claimed in claim 3,
wherein the engaging parts are configured to move between a first position in which the engaging parts are inside the inserting portion and a second position in which the engaging parts protrude from the inserting portion,
wherein, when moving from the second position to the first position, the engaging parts move towards each other along the second direction due to compression of the elastic member, and
wherein, when moving from the first position to the second position, the engaging parts move away from each other along the second direction due to extension of the elastic member.

5. The battery module as claimed in claim 4, wherein an end of each of the engaging parts exposed from the insertion portion in the second position has a triangular pyramid shape.

6. The battery module as claimed in claim 5, wherein the one of the cell cap or the bus bar having the insertion groove comprises a pressing portion configured to move the engaging parts from the second position to the first position by moving in the first direction or the second direction due to external pressure applied thereto.

7. The battery module as claimed in claim 3, wherein another end of the inserting portion is coupled to the hinge portion at a bending portion such that the inserting portion and the hinge portion are on different planes from each other.

8. The battery module as claimed in claim 7,
wherein the inserting portion is on a plane which includes the first direction, and
wherein the hinge portion is on a plane which includes the second direction.

9. The battery module as claimed in claim 3, further comprising an insulating tape on at least a portion of the cell cap and the hinge portion when the inserting portion is inserted into and coupled to the insertion groove.

10. The battery module as claimed in claim 2, wherein a protruding portion is formed on a surface of the inserting portion.

11. The battery module as claimed in claim 1, wherein the bus bar couples at least three of the battery cells to each other in parallel.

* * * * *